May 14, 1963
G. C. SHEATZ
3,089,483
MULTIPLE ELECTRODE HOLDERS FOR INDICATING
NERVE RESPONSES TO STIMULATION
Filed March 4, 1959
2 Sheets-Sheet 1
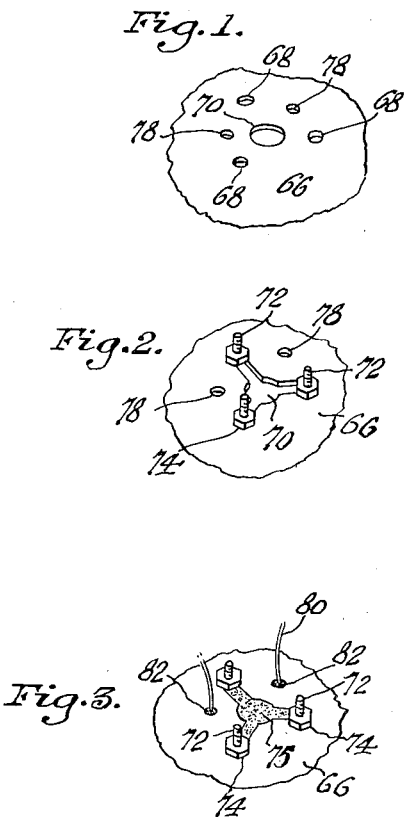
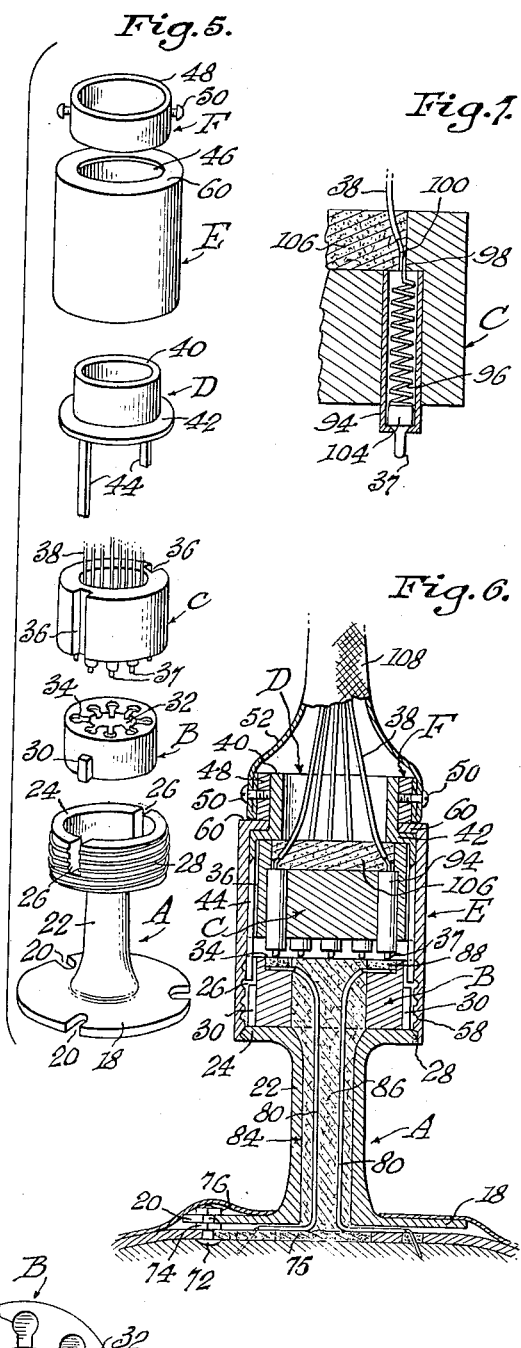
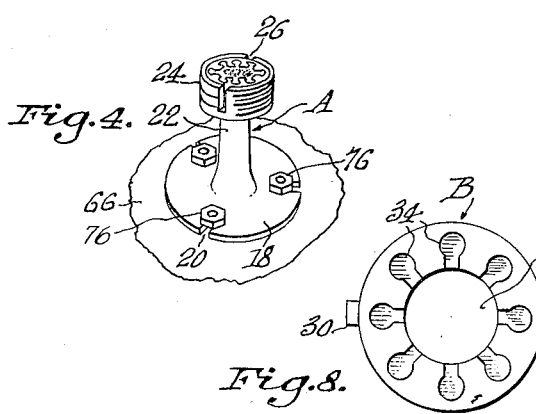
INVENTOR.
GUY C. SHEATZ
ATTORNEYS May 14, 1963
G. C. SHEATZ
3,089,483
MULTIPLE ELECTRODE HOLDERS FOR INDICATING NERVE RESPONSES TO STIMULATION
Filed March 4, 1959
2 Sheets-Sheet 2
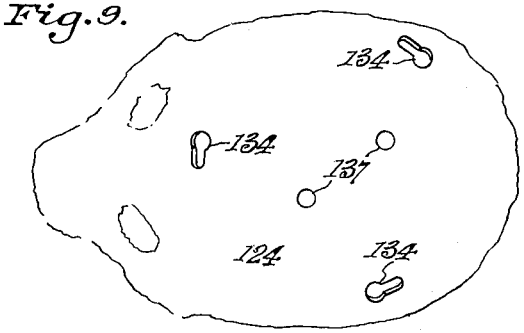
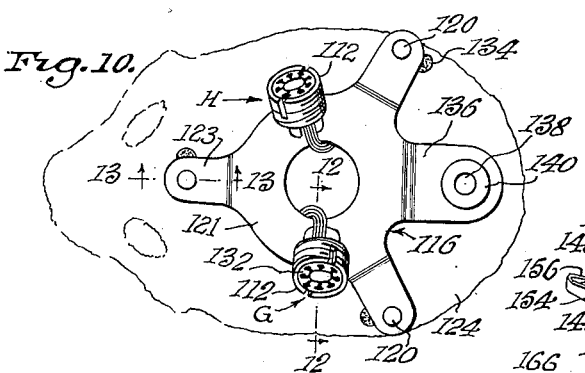
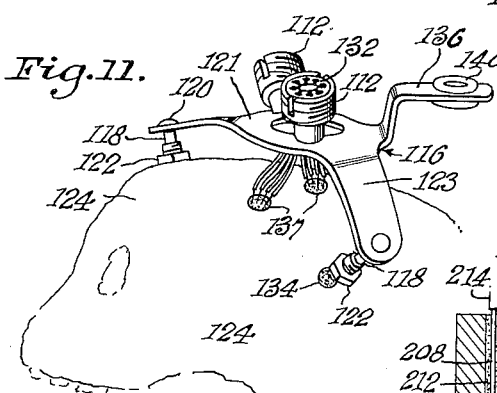
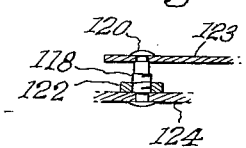
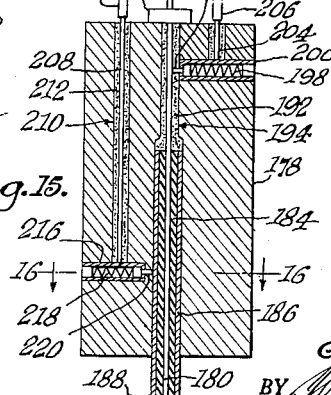
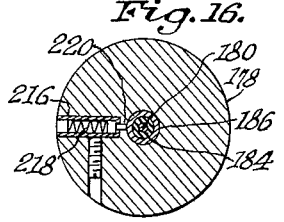
INVENTOR.
GUY C. SHEATZ
BY
ATTORNEYS 3,089,483
MULTIPLE ELECTRODE HOLDERS FOR INDICAT-
ING NERVE RESPONSES TO STIMULATION
Guy C. Sheatz, 6506 Ridge Drive, Washington, D.C.
Filed Mar. 4, 1959, Ser. No. 797,311
3 Claims. (Cl. 128—2.1)
(Granted under Title 35, U.S. Code (1952), sec. 266)

The invention described herein may be manufactured and used by or for the Government for governmental purposes without the payment of any royalty thereon.

The present invention relates to improved devices which are employed to implant electrode wires in brains of experimental animals and are employed to effect convenient and permanent access to the brains of such animals or patients; the implanted wires permit recording of electroencephalograms (brain waves) as they are affected by chemical or physical stimulation, by disease, by training, or by electrical stimulation which may be introduced through the implanted electrodes. The invention is of special value in the study of the unanesthetized brain where it externalizes the electrical coordinates of the higher mental processes, heretofore only accessible behaviorally to the psychologist. Of more practical importance is the ability to locate epileptogenic foci and less tangible abberations of mental life such as may be present in some forms of insanity. In the latter case, electrical stimulation has proved a useful adjunct to psychoanalysis. Stimulation has also induced pleasant states in patients and there are suggestions that it could be used to alleviate pain.

Considerable attention is being given to investigations related to the electrical reactions of the central nervous system in response to artificial stimulation from externally induced electrical excitation, from the effects of administered drugs, as well as stimulation produced in a subject animal from other causes including light and noise. The results of such studies are recorded by electroencephalographic recordings obtained through the use of electrodes implanted in the skulls of laboratory experimental animals, which electrodes are connected through suitable leads to the recording devices. The permanent attachment of such electrodes to the skulls of experimental animals so that the electrodes will be in contact with selected surfaces or areas of the brain of such animals, or the permanent implantation of such electrodes in selected areas of the brain of such animals has been given considerable attention and study.

Electrodes thus permanently affixed to or implanted in the skulls of such animals are referred to in the art as "chronic implanted electrodes," and electrical excitation of structures within the central nervous system in the total absence of anesthesia, chemical restraint, and surgical trauma was made possible by a chronic electrode technique developed over a score of years ago by the investigators Loucks and Gantt reported in J. Compar. Psychol., vol. 18, page 305, 1934.

The set of specifications to be met by an ideal chronic-implanted electrode, while not easy to devise, involves consideration of the following problems: (1) the properties of the embedded electrode itself; (2) the method of holding electrodes so that they do not move; and (3) the manner by which the free end of the electrode is connected to a stimulator or recording device. Any actual solution will represent a compromise of conflicting requirements. For example, the ideal implanted electrode should produce no mechanical or chemical damage to the skin or to the bone or to the brain tissue of the experimental animal; however, every actual one is toxic to some degree and it produces mechanical damage in the structures that surround it. The electrodes must be fixed mechanically, usually to the skull, in a rigid, permanent manner not likely to be disturbed by activity of the animal. This must be accomplished, however, in as small a space as possible to prevent infection, tissue damage, and sloughing of the overlying skin. Since the direction of much research is toward implanting many electrodes in a single preparation, the requirement of small size is not an easy one to meet. The system employed also should be adaptable to the heads of different animals, should permit implantation of electrodes at the brain surface or deep within the brain, and should not preclude the use of a stereotaxic instrument. Also, the free ends of the implanted wires must be available in such a way that quick and certain connection to a stimulator or recorder is possible.

No commercially available electrode is known that will meet all of the above specifications. However, there are numerous reports in the literature of attempts by research workers themselves to solve the stated problems, and various metals have been employed for electrodes, such including copper, silver or silver chloride, stainless steel, platinum, and molybdenum. Most implanted electrodes are insulated except at the tip, many varieties of insulating materials including glass and many varieties of self-hardening synthetic plastic materials applied in liquid form or dissolved in volatile solvents. The shapes and forms of the electrodes employed vary from phonograph needles hammered through the skull, through plates or balls, to pools of mercury. Needles, either singly or in pairs, have been used for cortical and subcortical recordings and stimulation. Arrays of stacked wires are unusually successful for subcortical recording, and concentric electrodes and also microelectrodes have been employed.

Many arrangements in which the electrode is an integral part of a plate attached to the skull of the experimental animal have been employed. The skull crest has even been replaced with a casting made from a dural impression and as many as six hundred and ten electrodes have been implanted in one animal. In others, a base plate of plastic or metal is attached to the skull and the electrodes are made to pass through it. The base plate may be attached to the head by screws or itself threaded and screwed into the skull. In some of these base plates provision is made for its orienting the electrodes for implantation. The simplest attachments are made with screws and cement or by twisting a length of wire that has been passed through two holes in the skull around the collected, insulated electrode wires. Frequently, the free end of the electrode wire is simply soldered to the leads from the outside instrument. Miniature and subminiature radio tubes and hearing aid sockets also have been used as connectors, these being fixed to the skull with wires or attached to a harness worn by the animal.

From the foregoing summary it is evident that a large variety of proposals have been advanced in attempting to solve the many problems posed in maintaining functioning electrode contacts with the brain of an experimental animal. There are few frustrations to match the experience of entering the laboratory to perform a critical experiment only to find that overnight the animal has managed to pull out its electrodes.

The present invention provides means for maintaining a desired number of implanted electrodes in desired position with minimum possibility of dislocation through activities of the subject animal. The invention comprises, in general, three embodiments which may be referred to as follows:

(1) A "pedestal rigid electrode holder," which is a device for fastening to the skull of an animal, such as a cat or a monkey, electrodes which are implanted in the animal's brain, and which holds the implanted electrodes in a rigid manner so that they are not likely to be disturbed by the activity of the animal, and which provides connection between the implanted electrodes and an outside stimulating or recording instrument. In general, this device comprises a pedestal which is fastened to the skull by means of a screw arrangement; the implanted electrodes pass upward through the pedestal center; a contact cup fits into the pedestal and the electrodes are cut and fitted into individual slots of the cup; dental cement is used to fill the shaft of the pedestal and dental amalgam is packed into each of the slots that contains the free end of the electrode wires; external wires are threaded through and fitted into a connector which is attached to the pedestal, making electrical contact with the electrodes terminated in the contact cup.

(2) A "tripod restraining electrode holder," which is a device which restrains the animal and provides convenient connections to the implanted electrodes. The device comprises up to six "pedestal rigid electrode holders" mounted on a rigid tripod. The tripod is fastened to the skull by a screw arrangement, and it is provided with a flange by means of which connection may be made to restrain the animal and to hold its head in a relatively fixed manner.

(3) A "small animal electrode," which permits recording and stimulating small animals such as rats and guinea pigs. It comprises an electrode array and a clip for fastening to the skull of the animal, and additionally, the device comprises steel spring hooks which rotate freely where connected to a coiled spring, a connecting block, and a rotating coupling device which prevents snarling and twisting of the leads by allowing connectors to rotate freely in the axis of a "Plexiglas" rod.

The structural details of the foregoing generally-referred to embodiments are illustrated in detail in the accompanying drawings, in which—

FIG. 1 is a fragmentary representation of a portion of a skull of an experimental animal which has been prepared to receive the attaching means of the pedestal rigid electrode holder, noted above as embodiment No. 1;

FIG. 2 is a view of a portion of the skull, showing attaching means of the pedestal rigid holder secured in position on the skull;

FIG. 3 is a similar view of a portion of the skull showing the attaching means of FIG. 2 in position and with electrical leads cemented in place in the skull;

FIG. 4 is a pedestal of the pedestal rigid electrode holder in position and attached to the skull;

FIG. 5 is a disassembled or exploded perspective view of all elements composing the pedestal rigid electrode holder;

FIG. 6 is an enlarged vertical section of the assembled pedestal rigid electrode holder permanently mounted on the animal's skull;

FIG. 7 is a detailed vertical section showing structural details of one of the contact elements employed in the pedestal rigid electrode holder;

FIG. 8 is an enlarged plan view of an element employed to carry the electrode contacts of the pedestal rigid electrode holder;

FIG. 9 is a fragmentary representation of a portion of a skull of an experimental animal which has been prepared to receive the tripod restraining electrode holder of embodiment No. 2 above;

FIG. 10 is a similar view, showing the tripod restraining electrode holder in place;

FIG. 11 is a perspective view of the tripod restraining electrode holder on the skull;

FIG. 12 is a detailed sectional view taken on line 12—12 of FIG. 10;

FIG. 13 is a detailed sectional view taken on line 13—13 of FIG. 10;

FIG. 14 is a perspective view of a small animal electrode as referred to above in the general description of embodiment No. 3;

FIG. 15 is a vertical sectional view through a rotating coupling device employed in connection with the small animal electrode as shown in FIG. 14; and FIG. 16 is a horizontal sectional view taken on line 16—16 of FIG. 15.

Referring more particularly to the drawings and more particularly in the first instance to FIGS. 1 through 8, there is shown an embodiment of the invention which is referred to above herein as a type of "pedestal rigid electrode holder," embodiment No. 1, which holder is adapted to be attached permanently to an experimental animal's skull for holding implanted electrodes in a rigid manner so that they will not likely be disturbed by the activity of the animal, and which provides connections between the implanted electrodes and an outside stimulating or recording instrument.

As will be noted from the drawings, this "pedestal rigid electrode holder" comprises a pedestal A which is adapted to be affixed to the skull of an experimental animal such as a cat or a monkey, a contact cup B which is receivable in the pedestal A, the contact cup B being adapted to receive a spring bar retainer C. The spring bar retainer C has mounted directly thereon a key collar D which receives a cap E surmounted by a shield ring F.

The structural details of these elements are as follows:

The entire assembly is fabricated from a lightweight synthetic plastic material such as an acrylic resin identified to the trade as "Lucite," which is an acrylic resin composition of E. I. du Pont de Nemours Company; or the assembly may be composed of any other moldable plastic material of light weight and possessing good dielectric properties.

The pedestal A is provided with a flanged base 18 having specifically three peripheral slots 20 which extend inwardly with respect to the base 18 from the periphery thereof, these slots being equidistantly spaced with respect to the periphery of the base. Extending upwardly from the base 18 is a hollow shank or shaft 22 which terminates at its upper end in a socket 24 having diametrically opposite keyway slots 26, and which is externally threaded as is indicated at 28.

The key-way slots 26 in the socket 24 are provided to receive oppositely disposed keys 30 on the contact cup B which fits into the socket 24 and has a central opening 32 from which extend radially a plurality (specifically, in practice, eight) of key-hole slots 34, the purpose of which will be pointed out hereinafter. Engagement of key members 30 of contact cup B in the keyway slots 26 of socket 24 of the pedestal A prevents turning of the contact cup B relative to the socket 24 when the contact cup B is assembled with the pedestal A.

The contact cup B receives spring bar retainer C. This element C also is a hollow cylinder, the periphery of which has opposite slots 36, this element C providing spring-pressed means for retaining electrical leads 38 in properly spaced relation, as will be described in greater detail hereinafter.

The spring bar retainer C has mounted thereon a hollow cylindrical key collar D which is simply an open cylindrical section composed of a tubular cylindrical body 40 having a base flange 42 which seats on the top perimeter of spring bar retainer C, with elongated depending resilient key-bars 44 adapted to be received in the peripheral key slots 36 of spring bar retainer C, the resiliency of bars 44 in engagement with these slots 36 providing a firm mounting for the key collar D.

The key collar D receives hollow cylindrical cap E, the collar body 40 and flange 42 of the key collar D being receivable in the tubular passage 46 which extends through the cap E which, as will be referred to hereinafter, serves to interlock the parts of the apparatus when the latter has been assembled completely. Elongated key-bars 44 depend from the flange 42, as has been referred to previously, the key-bars 44 being adapted to be passed into key slots 36 and also into key slots 26 in pedestal A.

When assembled, the foregoing units or sections A, B, C, and D are firmly joined together and interlocked. The contact cup B is received in socket 24 of pedestal A with the key members 30 on the contact cup B engaging slots 26 of socket 24 to prevent relative turning between the socket 24 and the contact cup B.

The spring bar retainer C surmounts the contact cup B, with contacts 37 thereof entering slots 34 of the contact cup B.

The tubular cylindrical key collar D surmounts the spring bar retainer C. This key collar is secured against relative rotation by reception of the key-bars 44 thereof in the slots 36 of the spring bar retainer C and slots 26 of the socket 24 of pedestal A, the resiliency of the key-bars 44 in engagement with slots 36 providing a firm mounting for the key collar D, the spring bar retainer C being held in firm position by this engagement of the key-bars 44 with slots 36 and 26, as has been indicated above.

The aforesaid parts A, B, C, and D are interlocked in assembled relation by the cylindrical tubular cap E. As has been noted above, the upper end of the passage 46 through the cap E is smaller than the lower end, lower portions of the cap E being threaded internally as is indicated at 58, these threads 58 interfitting with threads 28 on socket 24 of the pedestal A. The upper end of the cap E defines a locking flange 60, which seats on, and interlocks with, the base flange 42 of the key collar D, the collar 40 of which extends snugly into the tubular passage 46 of the cap E and is interlocked therewith by the set screws 50 of shield ring F, these set screws 50 passing through registering holes provided therefor in the flexible cable shield 52 and shield ring F to bear against collar 40 of key collar D.

In practice, eight electrode leads are employed, although this number may be varied. Two goals are: (1) to fix the pedestal A firmly to the skull of the experimental animal, indicated at 66, by means of screws 72; (2) to produce contact terminals for the implanted electrodes which have been mentioned above within the "Lucite" contact cup B.

In order to fix the pedestal A to the skull of the subject animal, the calvarium of the skull, which is indicated at 66, is exposed and holes (in practice, three in number) such as are shown by reference numeral 68, and also a substantially larger central opening 70, are drilled down to the dura and are connected by drilling away intervening bone structures by means of a dental drill to form a Y-shaped defect in the skull, including the central opening 70 as is shown in FIG. 2.

The head of each of three stainless steel anchor screws 72 is lowered to the dura at the center of the Y-shaped defect, and is moved gently outwardly to the tip of an arm of the Y-shaped defect. Here each head and screw are fixed in position by a nut 74 moderately tightened against the skull and dental cement 75 is worked around the assembly for insuring rigidity. The location of each screw must be adjusted carefully at this stage, so that its projecting threaded portion will fit into its slot 20 on the base 18 of the pedestal A. The final step simply involves placing the pedesal A upon these screws 72, tightening another nut 76 upon each, and covering them with dental cement after the electrodes have been secured.

While the preparations for mounting the pedestal A are under way, the electrode implantation in the brain may proceed also. For this purpose, holes 78 are drilled in the skull and wires 80 are inserted into the brain with the aid of a stereotaxic instrument and fixed with dental cement 82 where they enter the skull. These wires 80 are collected into a bundle, threaded through the center 84 of the pedestal just prior to final attachment of the latter, and passed through the "Lucite" contact cup B which is placed in socket 24 of pedestal A, the keys 30 providing a secure fit into one or the other of the diametrically opposed key slots 26 machined in the socket 24.

Each of the electrode lead wires 80 now is to be secured permanently in the "Lucite" contact cup B. This is accomplished by cutting each wire about three-sixteenth inch from the face of the contact cup B and tamping the short uninsulated end into one of the small slots 34, prepared to receive it. When all of the wires are so located, dental cement 86 is used to fill the shaft 22 of the pedestal A from which the wires emerge. Once this cement has hardened, dental amalgam 88 is packed into the contact cup B which contains the free ends of the electrode wires. When this amalgam solidifies, an excellent permanent electrical contact is produced. All kinds of wires including wire microelectrodes have been brought to the surface in this way.

Minor technical matters that often distinguish success from failure in the above procedure include the following:

(1) The consistency and quantity of dental cement used at the various stages: the mix should be somewhat thinner than that ordinarily used in dentistry, and particularly thin when the pedestal shank or shaft 22 is being packed. Minimum quantites should always be employed, especially in those locations where cement will be adjacent to subcutaneous tissue. As to the electrode wires, it is desirable in practice to apply some code, color or otherwise, to the free ends before implantation to permit exact identification of what brain location is being made available at each amalgam contact. Finally, when the amalgam is applied, all excess of amalgam must be removed, or short circuits to other wires or to the pedestal A itself may occur.

FIG. 7 of the drawings shows certain structural details of the spring bar retainer C. The bundle of eight electrode wires 38 enters this spring bar retainer C. Also, there are provided eight spring holders 94, each of which is of suitable metal where the spring bar retainer C is composed of a molded plastic ("Lucite"). Within the retainer 94 is positioned a compressed coil spring 96 of suitable conductive material, such as metal, the upper end of which is extended into an electrical contact 98 which is in soldered contact with the bare end 100 of one of the wires 38. The opposite end of spring 96 bears against the head 104 of a piston contact 37 which is urged continuously thereby into electrical contact with the dental amalgam 88 in the contact cup B. The springs 96 are ordinarily used to attach wrist bands to wrist watches, but in the instant case they make possible tight electrical contacts between the amalgamated ends of the electrodes in the pedestal and the lead-off wires 38 to the recording apparatus. The space in the spring bar retainer C above the holder element 94 is filled with dental cement 106 which keeps the wires 38 suitably separated.

In order to assemble the pedestal rigid electrode holder illustrated in FIGS. 1 through 8, the needed number of wires, preferably of different colors and in practice eight in number, are threaded through the cable shield 52 which has a stricture 108 therein, shield ring F, key collar D, and spring bar retainer C. To the end of each wire, as designated at 100, a coil spring 96 is soldered. In preparation for this, the non-movable tip or end 98 of the spring 96 should be filed down carefully to about one-half of its diameter and tinned. All soldering should be done carefully, so that when the wire 38 is pulled back the spring 96 seats firmly in its socket and its tip projects about 3/64 inch beyond the top edge of each spring bar holder 94.

Four additional steps complete the assembly of the connector. The key collar D is pulled down upon the retainer C so that keys 44 of the key collar D engage the keyway slots 36 of the spring bar retainer C. Next the cap E is pulled down over the key collar D and the spring bar retainer C until the collar 40 of key collar D projects through and above flange 60 of the cap E. Now the shield ring F is secured to the end of the cable shield 52, precaution against damage to the lead wires 38 being taken by wrapping masking tape between them and the cable shield 52 during such securing. The shield ring F is brought down over and around the collar 40 of the key collar D and secured there by tightening the set screws 50 of the shield ring F. The cable shield 52 which was expanded in order to pull it over the lead wires 38 is "milked" backward over the wires, the spring bar retainer C being kept in position by the stricture 108 of the cable shield 52 on the lead wires, but it may be protruded easily for inspection by re-expanding the cable shield. No precautions are needed against the wires being pulled out because any pull is transmitted only by the cable shield.

When the connector sleeve E is secured to the pedestal A, the spring pin contacts 37 are firmly pressed against the electrode amalgam points 88, alignment being assured since the tips of the key collar keys 44 fit snugly into keyways 26 of the pedestal.

It may be noted that normally there are no forces tending to pull the assembly apart; consequently no special design is needed to hold it together. In fact, some users of this device purposely disengage the cap E at the time of connection in order to be able to see the entrance of the keys 44 of the key collar D into the keyways 26 of socket 24 of pedestal D. The assembly is adequately held together by the stricture of the expandable cable shield 52, shown in FIG. 6 as secured over the shield ring F. In use, tension is exerted on the cable shield 52 before it reaches the recording wires 38 inside of the cable shield so that the connection to the spring bar retainer C is not called upon to resist pulling.

(2) The "tripod restraining electrode holder" is shown in structural details by FIGS. 9 through 13 inclusive, of the drawings.

This device combines the functions of restraining the animal and providing convenient connections to the implanted electrodes. It was developed to minimize artifacts in the electroencephalograph recordings from monkeys simultaneously engaged in manual tasks.

As will be seen from the drawings, this device consists of two pedestals G and H, each of which is identical in construction with pedestal A of the previously described apparatus, FIGS. 4, 5, 6, 7, and 8. However, pedestals G and H are mounted upon a light but rigid tripod shown generally at 116 having an annular body portion 121 and outwardly projecting bracket arms 123 composed preferably of $\frac{1}{16}$-inch stainless steel sheet. The feet 118 of the tripod 116 are stainless steel binder head screws, silver-soldered to the tripod 116. The screw heads 120 are machined thin and chamfered. The threads are removed where the screw will be embedded in bone and scalp, enough, however, being left to secure a nut 122 which also has been machined thin. At implantation, these nuts 122 will be tightened against the skull 124 to anchor the device. The pedestals G and H each including socket 112 are exactly similar to pedestal A previously described above, except that each has been slotted along the shank portion 129 as is shown at 126 to receive the electrode wires 128, and their bases are silver-soldered to the tripod 116, as is indicated at 130 (see FIG. 12).

At implantation, the skull surface is exposed and the electrodes implanted in the manner described above. The electrode wires are collected into a bundle preparatory to assembly in the "Lucite" cup 132. The position of the tripod 116 is established by trial and error, and the three points where the feet 118 finally make contact are marked upon the bone. At each mark a keyhole-shaped portion of bone is removed, as designated at 134 (FIG. 9) down to the dura, and each foot 118 of the tripod 116 is inserted into and through the large portion of the resulting keyhole slots. When the nuts 122 have come into contact with the outside of the skull 124, the tripod is rotated until the shaft of each screw 118 comes to lie in the small portion of the keyhole slots. The nuts 122 then are tightened successively upon the skull with moderate tension and are locked in position by dental cement used also to fill the remaining defect in the bone. Once the tripod 116 is firmly in place, the electrode wires are arranged in the cup 132 in the manner described above and are implanted in the brain of the subject animal through holes 137 through the skull in the manner previously described above.

Two special features of the tripod make its use particularly attractive. First, as many as four additional pedestals can be soldered on the tripod 116, thus providing stable connections for forty-eight instead of sixteen implanted leads. Second, the firm attachment of the tripod to the skull allows the animal to be restrained by rigid or semi-rigid connection to the tripod 116 through flange 136 thereof. When a steel rod (not shown) of suitable diameter and flexibility is bolted to the flange 136 by a bolt inserted through bolt hole 138 of the flange, on the one hand, and to an appropriate fixed point above the animal on the other, the head of the animal will remain relatively fixed in space. If the upper connection is attached through a stiff spring, considerable latitude of movement up and down and to the side will be permitted, but rotation is prevented. The rubber grommet 140 is employed to silence the joint in question, and its use is advised whenever auditory experiments are performed.

Monkeys with the above-described tripod attached will exercise and feed freely, sleep well sitting on the haunches, and remain in good health for months.

(3) The "small animal electrode" referred to above herein, is shown in structural details in FIGS. 14, 15, and 16 of the drawings. Such devices permit recording and stimulating small animals like rats and guinea pigs.

This "small animal electrode" consists of two strips 142, 144, which in practice are approximately $\frac{1}{16}$-inch wide and $1\frac{1}{16}$-inch long, and are cut from stainless steel sheet approximately 0.018-inch thick. In each of strips 142, 144, each of which is bent similarly and in parallel at approximately ninety degrees, as is indicated at 146, a hole 148 is drilled near one end of each strip. In practice, the hole 148 is drilled to a diameter of approximately 0.028-inch, and all rough edges are filed until smooth. The ninety degree bends are located, in practice, at substantially $\frac{5}{16}$-inch from the end containing the hole 148. An enameled stainless steel wire 150 is soldered, as is indicated at 152, to the end of each strip opposite to the hole 148. Each of strips 142, 144 is coated completely with enamel to provide insulation, and is oven-baked. Each of the bent strips 142, 144 is put together as is shown in FIG. 14 with small paper shims (not shown) inserted between them, and the entire assembly is dipped in a solidifiable liquid insulating material, for example, the normally liquid insulating composition known to the trade as "Insl-x," which dries to a hard resinous coating. This insulating material is cleaned out of the holes 148 prior to hardening of such material.

A stainless steel clip 154 is used to fix the electrode array to the skull. It measures about $\frac{7}{8}$-inch (for use on a rat) in length and is shaped as shown on FIG. 14. At the time of implantation, this clip is fitted over the electrode array, and a crimping tool is used to drive its pointed tips 156 into the lateral surface of the skull to provide firm fixation.

At the time of implantation, the skull is widely exposed from the dorsal approach. A hole about two inches in diameter is drilled through the bone over the desired brain location. The base 142, 144 of the electrode array is covered with dental cement, and the wires 150, having previously been cut to the proper length, are introduced through the hole into the brain. The stainless steel clip 154 now is positioned over the electrode base 142, 144, its pin tips 156 driven into the skull, and dental cement worked in around it and the electrode array. If the pin clip 154 can be moved when in position, it should be lifted and cement worked under it. Minimum quantities of cement should be used to prevent later sloughing of the scalp. The skin edges are approximated with slik sutures. The total operation, after practice, can be performed in approximately ten minutes.

The remaining devices illustrated in FIGS. 14, 15, and 16, connect the implanted electrodes to stimulating or recording devices. Steel spring hooks 158 when inserted into holes 160 in electrode strips 142, 144, make the contact with the animal. These hooks may rotate freely at 162 where they make connection with the coiled springs 164. This free rotation is achieved by soldering a small length of No. 22 hypodermic needle tubing to the end of the coiled springs 164 into which each hook is passed before its end is bent at 166. This unusually flexible connection precludes applying damaging leverage forces to the implanted device but has proved, nevertheless, to be electrically adequate.

Piano wires 170 forming the coiled springs 164 enter a "Lucite" block 168 which, in practice, measures about 6 x 6 x 3 mm. within which the wires 170 are bent so as to provide a rigid upright position for the coiled spring portions 164. At the "Lucite" block 168, soldered connections are made between the wires 170 and the lead-off wires 172, and the shielding 174 is fixed firmly through a screw 176.

The lead-off wires 172, which are of any desired length, are interrupted by, but make continuity through a "Plexiglas" coupling rod 178 indicated to the right of FIG. 14, and shown in greater structural details in FIGS. 15 and 16. Coupling rod 178 prevents snarling and twisting of the leads 172 by allowing connectors 180 and 186, which in effect are continuations of leads 172, to rotate freely within the coupling rod 178. The connector 180 is, in practice, a piece of stainless steel wire approximately 0.036-inch in diameter, around which polyethylene tubing 184 has been passed for the purpose of insulating the connector wire 180 from connector sheath 186, with which latter element connector 188 is integral. This connector sheath 186, in practice, is conveniently a segment of a hypodermic needle.

The connector sheath 186 terminates short of the upper end of connector lead 180, the upper end of which projects above the top end of the rod 178. A retaining collar 190 is soldered to the projecting tip of connector 180 and retains the conducting assembly in the rod 178. Dental cement 192 fills the space about connector 180 and passage 194 above the point of termination of the polyethylene wrapping and conductive sheath 186.

A wiping contact 196 engages the upper portion of connector 180, this contact 196 being urged continuously against connector 180 by a coil spring 198 maintained under compression in a tubular metallic sleeve 200 by compressed coil spring 198. Lead 204, provided with an insulating covering 206, connects the device with the stimulator or recorder instrumentalities (not shown), the circuit to which is completed by lead 208 extending upward through passage 210 in connecting rod 178, the space between lead 208 and passage 210 being filled with dental cement 212. Lead 208 is insulated as is shown at 214, and is energized by contacting conductive sleeve 216 which contains compressed coil spring 218, which spring continuously urges contact 220 into wiping engagement with conductive sheath 186 in the connector assembly.

It may be noted that the structure of contact assemblies 196 and 220 is similar to the previously described contacts 94 of the spring retainer C described above herein in connection with the "pedestal rigid electrode holder," form No. 1 of the invention described above herein, particularly in connection with FIGS. 5, 6, and 7 of the accompanying drawings. It may be noted and pointed out, that continuous electrical connection with freely moving rats has been maintained for weeks through the use of this coupling.

I claim:

1. An apparatus for permanently retaining electrode leads implanted in the brain of an experimental animal which is employed, in conjunction with electroencephalographic-indicating instrumentalities, to stimulate the animal and to obtain repeated electroencephalograms of the animal over an extended period of time comprising:
    (a) A pedestal having,
        (1) A flange shaped to fit snugly the skull of the animal and adapted to be bolted thereto;
        (2) A socket at the end of the pedestal opposite said flange;
        (3) A longitudinal passage through the pedestal;
    (b) A cup member fitted and locked within the pedestal socket having,
        (1) A longitudinal passage registering with the passage in the pedestal;
        (2) At one end, a plurality of slots communicating with the longitudinal passage;
    (c) A plurality of electrode leads adapted to be implanted in the animal's brain at one end and passing through the longitudinal passages in said pedestal and cup member, the second end of each electrode lead terminating in one of said slots of said cup member;
    (d) Solidified conductive material overlying an exposed portion of the electrode lead in each of the slots of said cup member;
    (e) Separable connector means for selectively connecting and disconnecting the said electrode leads to and from the aforesaid electroencephalographic-indicating instrumentalities comprising,
        (1) A wiping contact member having a plurality of spring pressed contact elements each adapted to make electrical contact with the solidified conducting material in one of the slots of said cup member;
        (2) An electrical lead connected to each of said contact elements and capable of further connection to the said encephalographic-indicating instrumentalities;
        (3) Means for selectively locking the said wiping member in mechanical and electrical engagement with said cup member and pedestal.

2. An apparatus for permanently retaining electrode leads implanted in the brain of an experimental animal which is employed, in conjunction with electroencephalographic-indicating instrumentalities, to stimulate the animal and to obtain repeated encephalograms of the animal over an extended period of time comprising:
    (a) A tripod mounting having,
        (1) An annular body;
        (2) A plurality of bracket arm members extending outwardly from the annular body and adapted to be bolted at their distal ends to the animal's skull;
        (3) A flange extending from said annular body for connection to a device for restraining the animal;
    (b) Electrode lead holder means affixed to the tripod mounting having,
        (1) A shank portion extending upwardly from the tripod mounting and terminating in a socket member;
        (2) A cup member fitted and locked within the said socket member;
    (c) A plurality of electrode leads insulated from each other, each adapted to be implanted at one end in the animal's brain, each passing through the center of said annular body, and the shank of said electrode lead holder means to said cup member where it is affixed to an electrical terminal;
    (d) Separable connector means for selectively electrically connecting and disconnecting the said electrical terminals to the aforesaid electroencephalographic-indicating instrumentalities.

3. An apparatus for permanently implanting electrode leads in the brain of a small experimental animal such as a rat or a guinea pig through a hole in the animal's head and used, in conjunction with electroencephalographic-indicating instrumentalities, to stimulate the animal and to obtain repeated electroencephalograms of the animal over an extended period of time comprising:
    (a) A clip member terminating at its ends in opposing inwardly directed sharp points adapted to penetrate the animal's skull from opposite sides;
(b) A pair of insulated strip leads each having a small hole therethrough and secured to said clip member;
(c) Electrode leads electrically connected to the strip leads and adapted to be permanently implanted in the animal's brain;
(d) Separable connector means for selectively electrically connecting and disconnecting the said strip leads to and from the aforesaid electroencephalographic-indicating instrumentalities comprising,
   (1) A pair of electrically conducting spring hooks each adapted to engage and make electrical contact with one of said electrode leads through the hole provided in said lead;
   (2) A pair of electrically conducting coil springs rigidly mounted at one end on a single block of insulating material and each rotatably electrically connected to one of said spring hooks;
   (3) Rotating coupling means for electrically connecting each of said coil springs to said electroencephalographic-indicating instrumentalities.

References Cited in the file of this patent

UNITED STATES PATENTS

| | | |
|---|---|---|
| 1,093,112 | Clarke | Apr. 14, 1914 |
| 1,810,466 | Deutsch | June 16, 1931 |
| 2,549,836 | McIntyre | Apr. 24, 1951 |